US008054028B2

(12) United States Patent
Aoyama et al.

(10) Patent No.: US 8,054,028 B2
(45) Date of Patent: Nov. 8, 2011

(54) SERVO MOTOR CONTROL SYSTEM

(75) Inventors: Kazunari Aoyama, Minamitsuru-gun (JP); Kunitaka Komaki, Minamitsuru-gun (JP); Yasuharu Aizawa, Minamitsuru-gun (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 358 days.

(21) Appl. No.: 12/269,928

(22) Filed: Nov. 13, 2008

(65) Prior Publication Data

US 2009/0195206 A1 Aug. 6, 2009

(30) Foreign Application Priority Data

Feb. 4, 2008 (JP) ................................. 2008-023906

(51) Int. Cl.
G05B 19/18 (2006.01)
G05B 19/414 (2006.01)
G06F 19/00 (2011.01)
(52) U.S. Cl. .......................... 318/569; 318/600; 700/169
(58) Field of Classification Search .................. 318/4–7, 318/34, 560, 568.2, 569, 600, 111–113, 434, 318/450, 563; 700/21, 56, 169, 173, 177
See application file for complete search history.

(56) References Cited

U.S. PATENT DOCUMENTS

| 5,712,540 | A | 1/1998 | Toda et al. | |
|---|---|---|---|---|
| 6,430,634 | B1 * | 8/2002 | Mito | ............................. 710/100 |
| 7,164,965 | B2 * | 1/2007 | Kurakake et al. | ............. 700/177 |
| 7,196,488 | B2 | 3/2007 | Matsubara et al. | |
| 2005/0267625 | A1 * | 12/2005 | Kurakake et al. | ............. 700/177 |
| 2008/0052417 | A1 * | 2/2008 | Aoyama et al. | .................... 710/1 |
| 2010/0219787 | A1 * | 9/2010 | Iwashita et al. | ................ 318/721 |

FOREIGN PATENT DOCUMENTS

| JP | 3-093494 | 4/1991 |
|---|---|---|
| JP | 7-123766 | 5/1995 |
| JP | 8-35713 | 2/1996 |
| JP | 2003-169497 | 6/2003 |
| JP | 2005-86918 | 3/2005 |
| JP | 2007-73071 | 3/2007 |
| JP | 2007-202357 | 8/2007 |
| JP | 2007-295647 | 11/2007 |

OTHER PUBLICATIONS

Japanese Notice of Reasons for Rejection mailed Jul. 7, 2009 issued in Japanese Application No. 2008-023906 (including a partial translation thereof).

* cited by examiner

*Primary Examiner* — Walter Benson
*Assistant Examiner* — Eduardo Colon Santana
(74) *Attorney, Agent, or Firm* — Drinker Biddle & Reath LLP

(57) ABSTRACT

A table containing correspondence between "n" and "m" is set in a control circuit of a servo control system so that the current command data in the m-th (m=1, 2, 3 . . . ) current command register is assigned to the n-th (n=1, 2, 3 . . . ) servo amplifier. When data is specified in this table to satisfy "n=m", the current command data in the n-th current command register is passed to the n-th servo amplifier. When "m=1" is set for "n=1" and "m=1" is set for "n=2" in this table, the current command data stored in the first current command register is passed to the first and second servo amplifiers.

1 Claim, 7 Drawing Sheets

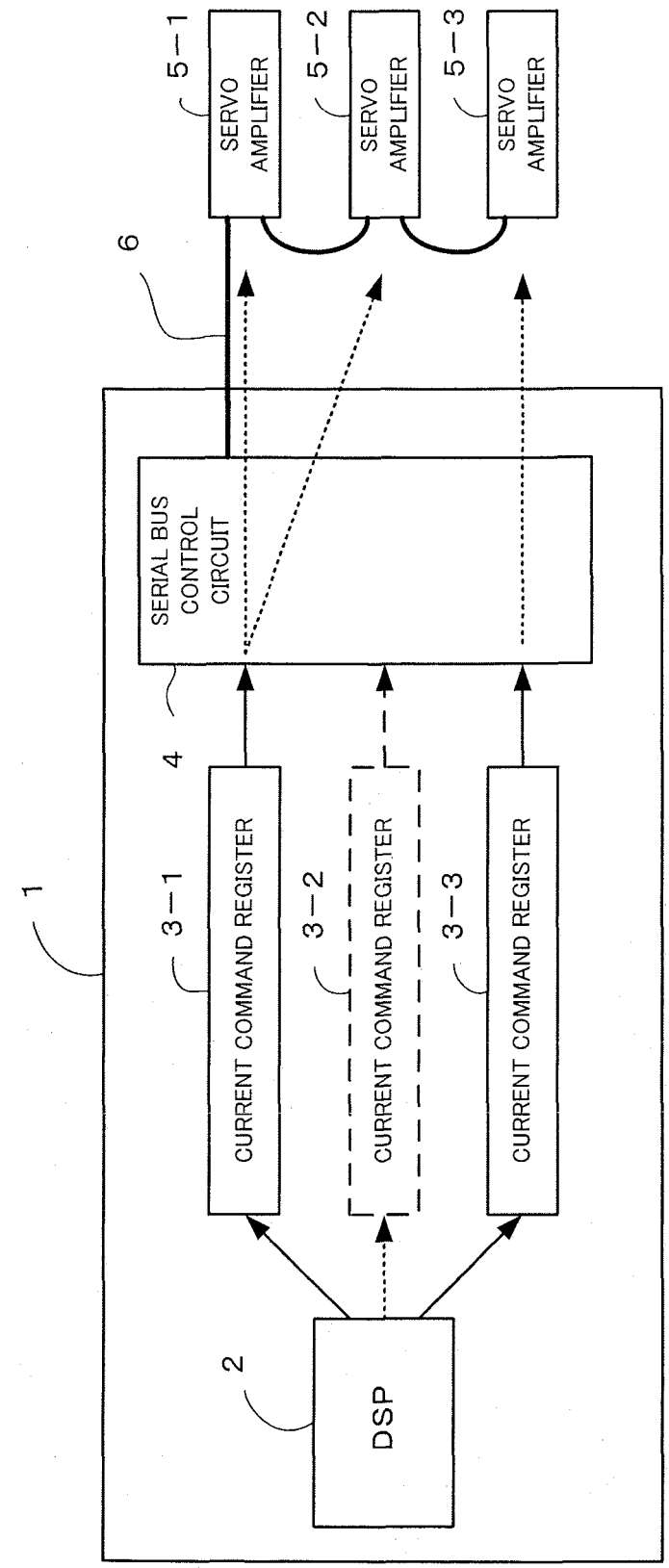

FIG. 2A

| SERVO AMPLIFIER NUMBER | CURRENT COMMAND REGISTER |
|---|---|
| SERVO AMPLIFIER 5-1 | REGISTER 3-1 |
| SERVO AMPLIFIER 5-2 | REGISTER 3-2 |
| SERVO AMPLIFIER 5-3 | REGISTER 3-3 |

FIG. 2B

| SERVO AMPLIFIER NUMBER | CURRENT COMMAND REGISTER |
|---|---|
| SERVO AMPLIFIER 5-1 | REGISTER 3-1 |
| SERVO AMPLIFIER 5-2 | REGISTER 3-1 |
| SERVO AMPLIFIER 5-3 | REGISTER 3-3 |

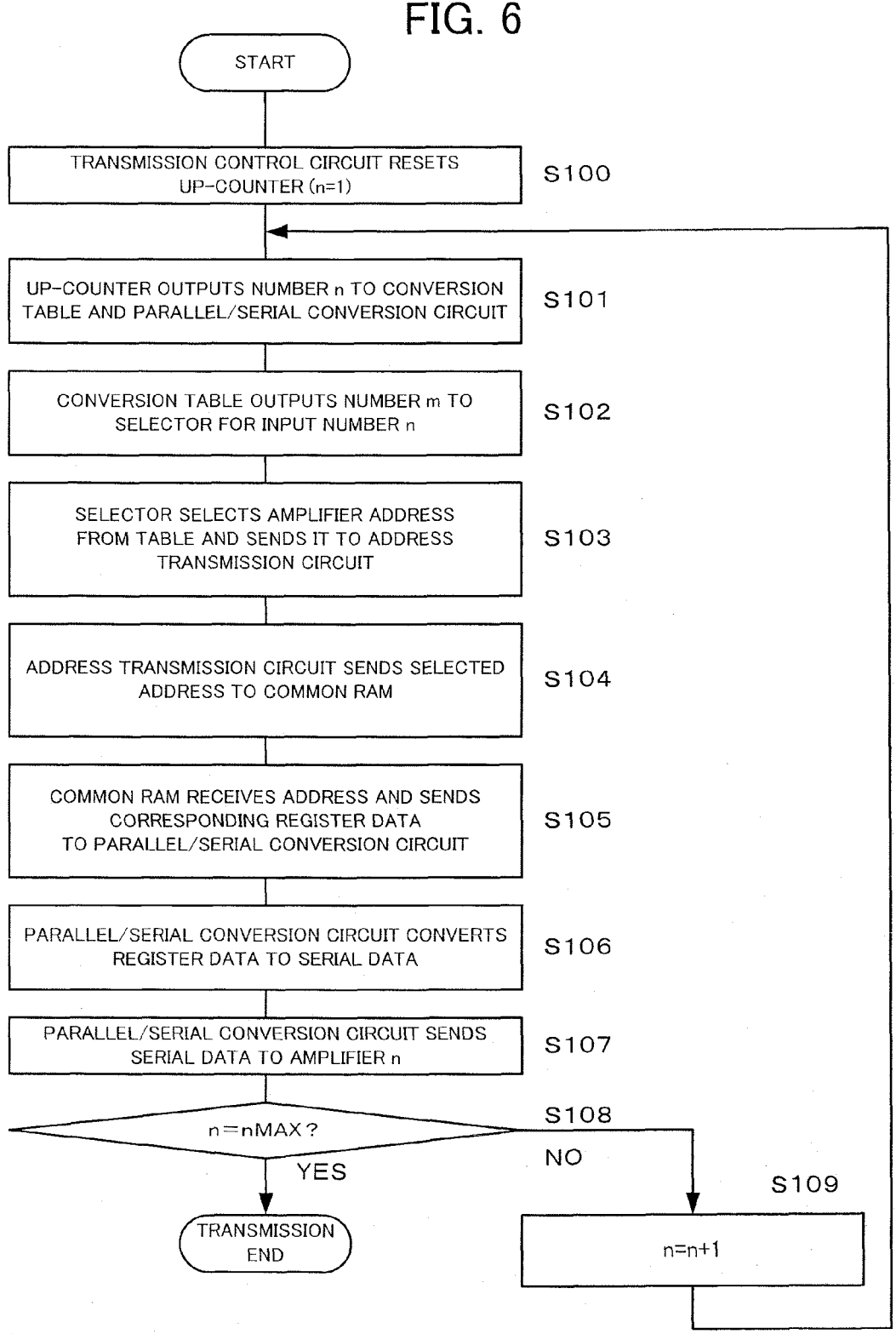

SERVO MOTOR CONTROL SYSTEM

RELATED APPLICATIONS DATA

This application claims priority under 35 U.S.C. §119 and/or §365 to Japanese Application No. 2008-023906 filed Feb. 4, 2008, the entire contents of which are incorporated herein by reference.

BACKGROUND OF THE INVENTION

1. Field of the Invention

The present invention relates to a servo motor control system that has, in a controller, a serial bus control circuit having a function of sending a current command in a plurality of different control modes to servo amplifiers for driving a servo motor.

2. Description of the Related Art

Driving and controlling a large-capacity motor requires a large-capacity inverter unit. However, acquisition of a large-capacity inverter unit is difficult because of constraints introduced by its components. Accordingly, a plurality of small-capacity inverter units are connected in parallel to obtain a large capacity required to drive and control a large-capacity motor.

When a motor control unit supplies a motor driving command to each of the plurality of small-capacity inverter units connected to drive the motor, the motor control unit needs to generate as many motor driving commands as the inverter units. In this case, a plurality of motor driving command generation units are exclusively used to drive a motor. As a result, when the motor control unit drives another motor in addition to the above one, a certain number of motor driving command generation units for driving the other motor are further required, thereby limiting the total number of motors that can be driven.

A motor control system that controls a plurality of inverter units using one motor driving command from a motor control unit and thereby drives one large-capacity motor is disclosed in, for example, Japanese Patent Application Laid-Open No. 2005-86918. This motor control system will be described with reference to FIGS. 7A and 7B.

A motor driving command, which is created by a motor control unit 20 and sent through a serial bus 24 from the motor control unit 20, is supplied through a relay unit 21 to a plurality of inverter units 22a to 22d in parallel. Each of the plurality of inverter units 22a to 22d is controlled by the same (common) motor driving command and drives a motor 23. As described above, the motor control unit 20 can control the plurality of inverter units 22a to 22d using only one motor driving command generation unit. Accordingly, when the motor control unit 20 drives one or more other motors in addition to the motor 23 above, it is enough to add one or more motor driving command generation units and the addition is not so difficult.

The relay unit 21 in FIG. 7A has a receiver circuit 21a, a setting circuit 21b, a computation circuit 21c, and a plurality of driver circuits 21d1 to 21dn as shown in detail in FIG. 7B. The plurality of driver circuits 21d1 to 21dn correspond to the plurality of inverter units 22a to 22d, respectively. The motor driving command (torque command) output as parallel data from the motor control unit 20 is received by the receiver circuit 21a of the relay unit 21 and input to the computation circuit 21c. The computation circuit 21c generates the motor driving command for the plurality of inverter units 22a to 22d. The generated motor driving command is simultaneously output as parallel data from the computation circuit 21c to the plurality of inverter units 22a to 22d through the plurality of driver circuits 21d1 to 21dn.

The motor control system in FIG. 7A has the relay unit 21 (see FIG. 7B) on the serial bus 24 that connects the motor control unit 20 and the motor 23. Therefore, a unit for controlling the motor 23 becomes complicated, making downsizing difficult. In addition, a command signal for the motor 23 is received by the relay unit 21 as serial data and, based on the received data, the command signal for the motor 23 is created, so response delay is caused.

SUMMARY OF THE INVENTION

An object of the present invention is to provide a servo motor control system that has, in a serial bus control circuit in a numerical controller, a function of sending a current command or a torque command to a plurality of servo amplifiers for driving motors in a plurality of different control modes.

The present invention relates to a servo motor control system in which a controller and a plurality of servo amplifiers are connected through a serial bus, a torque command or a current command for each of motors, generated by the controller, is sent to the plurality of servo amplifiers through the serial bus, and the plurality of servo amplifiers drive the motors based on the received torque command or current command.

This servo motor control system can select, for each servo amplifier, a first mode, in which an arbitrary current command generated by the above controller is sent through the serial bus to a plurality of servo amplifiers specified so that the plurality of servo amplifiers specified can drive one or more motors based on the same current command received, or a second mode, in which each a plurality of current commands generated by the controller is sent through the serial bus to a corresponding servo amplifier so that the servo amplifier can drive a corresponding motor based on a corresponding current command.

The above structure of the present invention eliminates the need for the relay unit on the serial bus, thereby enabling the downsizing and simplification of the unit. In addition, command information for a plurality of motors is processed before it passes through the serial bus, so no processing delay is caused.

BRIEF DESCRIPTION OF THE DRAWINGS

The purposes and advantages of the present invention, including those described above, will be clarified by reference to the attached drawings in combination with the description of the embodiment presented below. Of these drawings:

FIG. 1 illustrates a servo control system in which a serial bus control circuit of a numerical controller is placed in a mode in which data is read repeatedly from a current command register and sent to two particular servo amplifiers.

FIG. 2A indicates the correspondence between current command registers and servo amplifiers connected through the serial bus control circuit in a normal control mode.

FIG. 2B indicates the correspondence between the current command registers and the servo amplifiers connected through the serial bus control circuit placed in a tandem control mode.

FIG. 6 is a flowchart showing an example of the algorithm executed by the serial bus control circuit of the servo control system of the present invention.

DETAILED DESCRIPTION OF THE PREFERRED EMBODIMENTS

Figure 3:
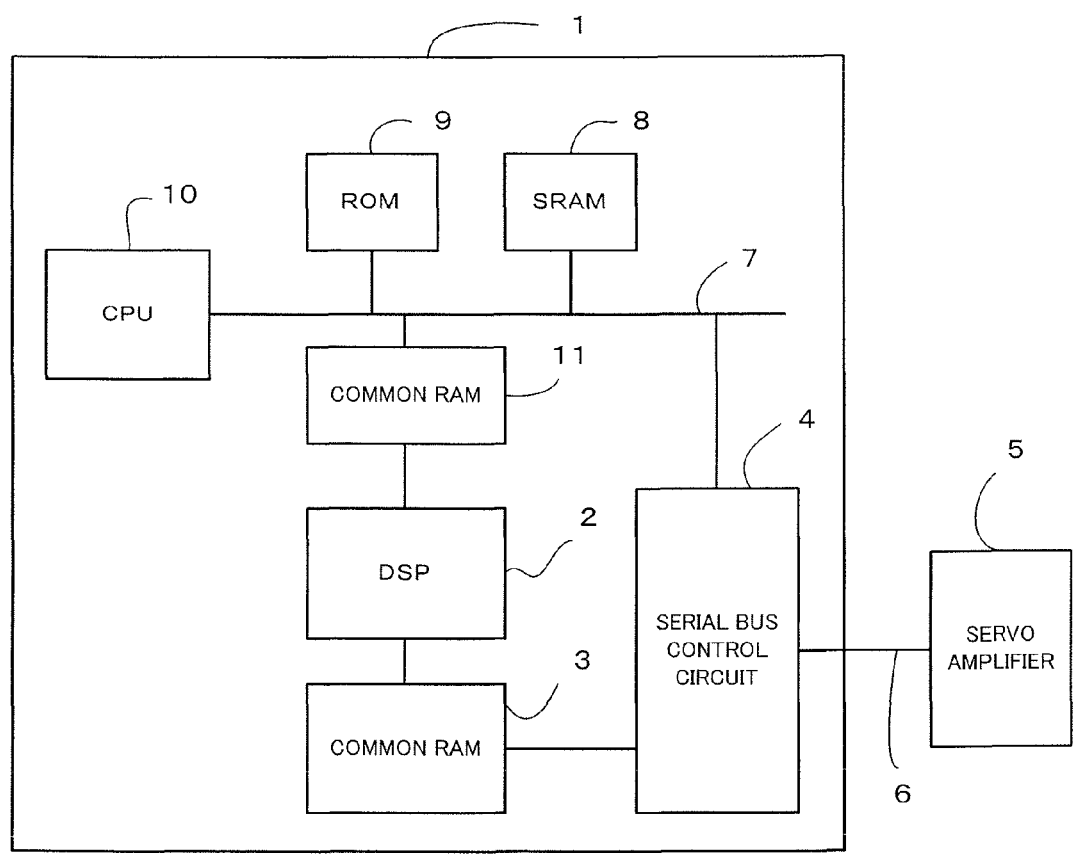
FIG. 3 is a block diagram showing an example of the numerical controller of the servo control system of the present invention.

FIG. 1 illustrates a servo control system in which a serial bus control circuit 4 in a numerical controller 1 is placed in a mode in which data is read repeatedly from a current command register 3-1 and sent to two particular servo amplifiers 5-1 and 5-2.

A digital signal processor (DPS) 2 calculates current command values (torque command values) for servo amplifiers 5-1, 5-2, and 5-3 to control the position, speed, and current of each servo motor using servo control software. The calculated current command values are stored in current command registers 3-1, 3-2, and 3-3, respectively, in a normal control mode described later. The current command registers 3-1, 3-2, and 3-3 are provided in association with the servo amplifiers 5-1, 5-2, 5-3, respectively. The serial bus control circuit 4 reads out the current command values stored in the current command registers 3-1, 3-2, and 3-3, converts the read current command values from parallel signals to serial signals, and then gives the converted signals to the servo amplifiers 5-1, 5-2, 5-3 through a serial bus 6.

Tandem control by a first motor (not shown) connected to the servo amplifier 5-1 and a second motor (not shown) connected to the servo amplifier 5-2 will be considered below. The tandem control is a method of using a plurality of motors to drive a large movable member which would be difficult to accelerate or decelerate by one motor, through a current command generated by a numerical controller. In the tandem control, the same (common) current command value is given to the servo amplifiers 5-1 and 5-2. In a normal control mode in which the same current command value is stored in the current register 3-1 for the servo amplifier 5-1 and the current register 3-2 for the servo amplifier 5-2, the DSP 2 needs to calculate the current command value twice, thereby consuming its processing power unnecessarily.

The servo control system of the present invention places the numerical controller in a tandem control mode described below instead of the normal control mode above, thereby carrying out a tandem control. In this tandem control mode, the current command value for the servo amplifier 5-2 is not stored (is stored in the normal control mode) in the current command register 3-2 in FIG. 1. The serial bus control circuit 4 repeatedly reads the current command value from the current command register 3-1, and uses it as the current command value for the servo amplifier 5-2, in addition to the current command value for the servo amplifier 5-1. If the number of motors used for the tandem control is K (K=2, 3 . . . ), the serial bus control circuit 4 reads the current command value from the same current command register K times. The serial bus control circuit 4 gives, through a serial bus 6, the same current command value that it read from the same current command register 3-1 a plurality of times (K=2 in the example of FIG. 1), to a plurality of servo amplifiers 5-1 and 5-2 that drive motors used for tandem control.

Figure 7A:
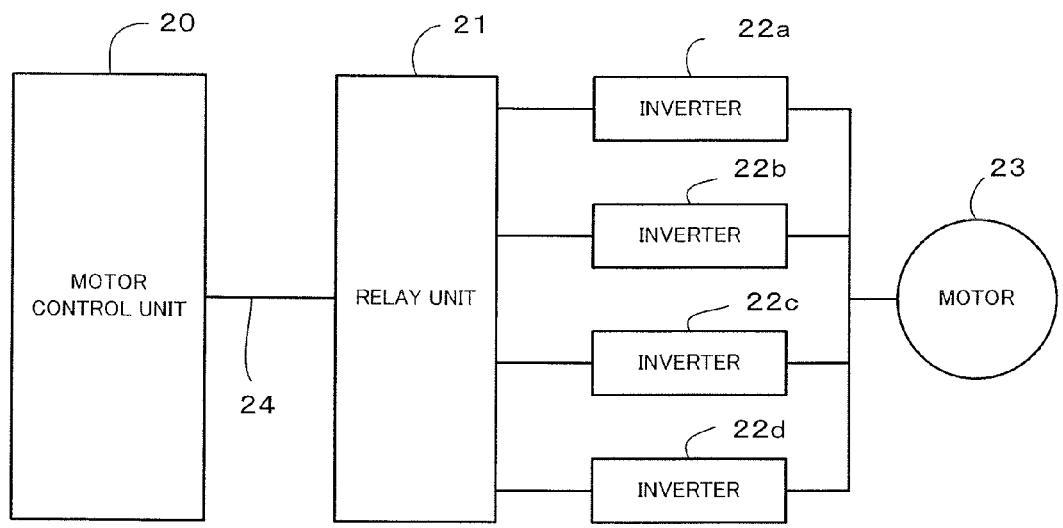
FIG. 7A is a block diagram showing an example of the motor control system in the prior art that controls a plurality of inverter units with one motor driving command from the motor control unit and thereby drives one large-capacity motor.
Figure 7B:
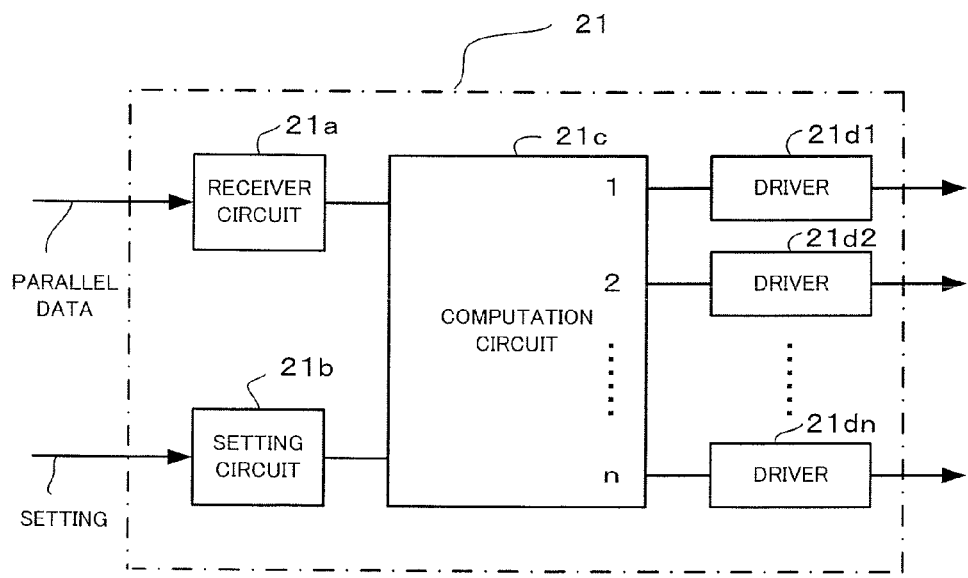
FIG. 7B is a block diagram showing a relay unit of the motor control system in FIG. 7A.

Therefore, if a control mode is placed in the above tandem control mode when carrying out tandem control by means of the servo control system of the present invention, the processing load of the DSP 2 need not be increased. In addition, this eliminates the use of the relay unit (see FIGS. 7A and 7B) required in tandem control in the prior art.

FIG. 2A indicates the correspondence between the current command registers 3-1 to 3-3 and the servo amplifiers 5-1 to 5-3 connected through the serial bus control circuit 4 in the normal control mode. In this control mode, a current command value for the servo amplifier 5-1 is stored in the current command register 3-1, a current command value for the servo amplifier 5-2 is stored in the current command register 3-2, and a current command value for the servo amplifier 5-3 is stored in the current command register 3-3.

FIG. 2B indicates the correspondence between the current command registers 3-1 to 3-3 and the servo amplifiers 5-1 to 5-3 connected through the serial bus control circuit 4 in the tandem control mode. In this control mode, a current command value for the servo amplifier 5-1 is stored in the current command register 3-1, a current command value for the servo amplifier 5-2 is also stored in command register 3-1, and a current command value for the current the servo amplifier 5-3 is stored in the current command register 3-3. In the tandem control mode, the current command register 3-2 is not used.

It is possible to switch the control mode of the numerical controller 1 between the normal control mode as in FIG. 2A and the tandem control mode as in FIG. 2B without changing the hardware configuration of the numerical controller 1.

The number of current command registers and servo amplifiers is assumed to be three in FIGS. 1, 2A, and 2B, but the number is not limited to 3.

FIG. 3 is a block diagram showing an example of the numerical controller of the servo control system of the present invention. The numerical controller 1 comprises a processor (CPU) 10, a DSP 2, a first common RAM 3, a serial bus control circuit 4, an SRAM 8, a ROM 9, and a second common RAM 11.

The CPU 10 can access the DSP 2, the serial bus control circuit 4, the SRAM 8, the ROM 9, and the second common RAM 11 through a bus 7. The CPU 10 sends data to or receives data from the DPS 2 through the second common RAM 11. When the CPU 10 writes a movement amount to the second common RAM 11 at specified intervals, the DSP 2 reads out the movement amount from the second common RAM 11 and, based on the read movement amount, calculates the current command value for each servo motor.

The current command values calculated by the DSP 2 are written to current command registers in the first common RAM 3. The serial bus control circuit 4 reads out the current command values from the current command registers in the first common RAM 3 and gives the read current command values to the servo amplifiers 5 (servo amplifiers 5-1 to 5-3) through the serial bus 6.

In the tandem control mode, the serial bus control circuit 4 reads out, a plurality of times (for example, twice), the current command value in one (for example, the current command register 3-1) of a plurality of current command registers in the first common RAM 3 by setting a parameter, sends the read value to a plurality of servo amplifiers (for example, the servo amplifiers 5-1 and 5-2), and drives a plurality of servo motors based on the same current command value.

In the normal control mode, on the other hand, the serial bus control circuit 4 reads out once each of the current command values in the plurality of current command registers 3-1, 3-2, and 3-3 in the first common RAM 3, sends each of them to the corresponding one of the servo amplifier 5-1, 5-2, and 5-3, and drives the corresponding motor based on the current command value.

Figure 4:
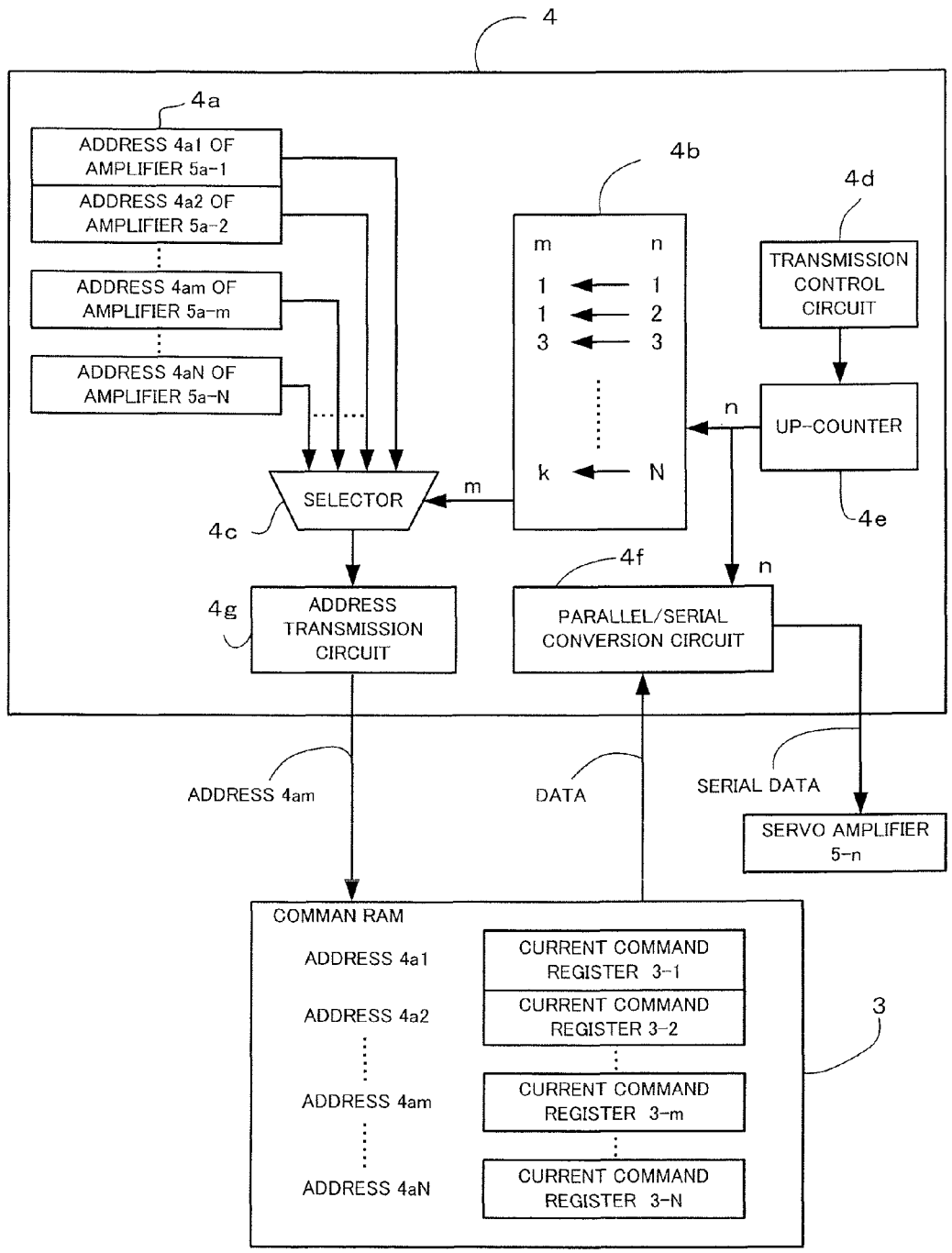
FIG. 4 is a schematic block diagram showing the serial bus control circuit of the numerical controller in FIG. 3, the serial bus control circuit being placed in a first control mode (tandem control mode).

FIG. 4 is a schematic block diagram showing the serial bus control circuit 4 of the servo control system of the present invention, the serial bus control circuit being placed in the tandem control mode.

The serial bus control circuit 4 has an address table 4a, a conversion table 4b, a selector 4c, a transmission control circuit 4d, an up-counter 4e, a parallel/serial conversion circuit 4f, and an address transmission circuit 4g. The address table 4a stores addresses 4a1, 4a2 ... of the servo amplifiers 5-1, 5-2 .... The first common RAM 3 includes the current command registers 3-1, 3-2 ... that correspond to the addresses 4a1, 4a2 ... of the servo amplifiers 5-1, 5-2 ... set in the address table 4a.

The conversion table 4b indicates the correspondence between servo amplifiers 5-1, 5-2 ... 5-n ... 5-N and current command registers 3-1, 3-2 ... 3-m ... 3-N. The conversion table 4b can be rewritten by a command from the CPU 10 to change the correspondence between the current command register 3-1, 3-2 ... and the servo amplifiers 5-1, 5-2 .... The conversion table 4b can also be rewritten to switch from the tandem control mode in FIG. 4 to the normal control mode in FIG. 5.

The transmission control circuit 4d increments the output value of the up-counter 4e by 1. The up-counter 4e outputs a count value "n" to the conversion table 4b. The conversion table 4b outputs "m" corresponding to "n" input from the up-counter 4e to selector 4c based on the correspondence (n-to-m conversion) shown in the table.

The selector 4c selects the address 4am of the m-th servo amplifier (servo amplifier 5-m) from the address table 4a according to "m" received from the conversion table 4b and then outputs the selected address 4am to the first common RAM 3 through the address transmission circuit 4g.

The first common RAM 3 outputs the register data in the current command register 3-m that corresponds to the address 4am of the servo amplifier 5-m received from the address transmission circuit 4g to the parallel/serial conversion circuit 4f. The register data, which is a current command value calculated by the DSP 2, is parallel data.

The parallel/serial conversion circuit 4f receives current command data from the first common RAM 3 and "n" output from the up-counter 4e. The output value "n" from the up-counter 4e is used to identify a servo amplifier (the servo amplifier 5-n is identified). The parallel/serial conversion circuit 4f converts the register data in the current command register 3-m from parallel data to serial data. The parallel/serial conversion circuit 4f also gives a pair of "n" for identifying a servo amplifier and the current command data stored in the current command register 3-m to the identified servo amplifier 5-n as serial data (for example, a packet signal). The servo amplifier 5-n that received the packet signal recognizes that the current command data stored in the current command register 3-m is a command sent to its own.

The operation of the serial bus conversion circuit 4 in which "m=1, 1, 3" is specified for "n=1, 2, 3" in the conversion table 4b as in FIG. 4 will be described below.

Since "m=1" is specified for both "n=1" and "n=2", the address 4a1 of the first (m=1) servo amplifier 5-1 is passed to the first common RAM3 and the current command value in the current command register 3-1 corresponding to the address 4a1 is read out and the current command value is passed to the first (n=1) servo amplifier 5-1 and the second (n=2) servo amplifier 5-2 through the parallel/serial conversion circuit 4f Next, the address 4a3 of the third (m=3) servo amplifier 5-3 is passed to the first common RAM 3, the current command value in the current command register 3-3 corresponding to the address 4a3 is read out, and the current command value is passed to the third (n=3) servo amplifier 5-3 through parallel/serial conversion circuit 4f.

Figure 5:
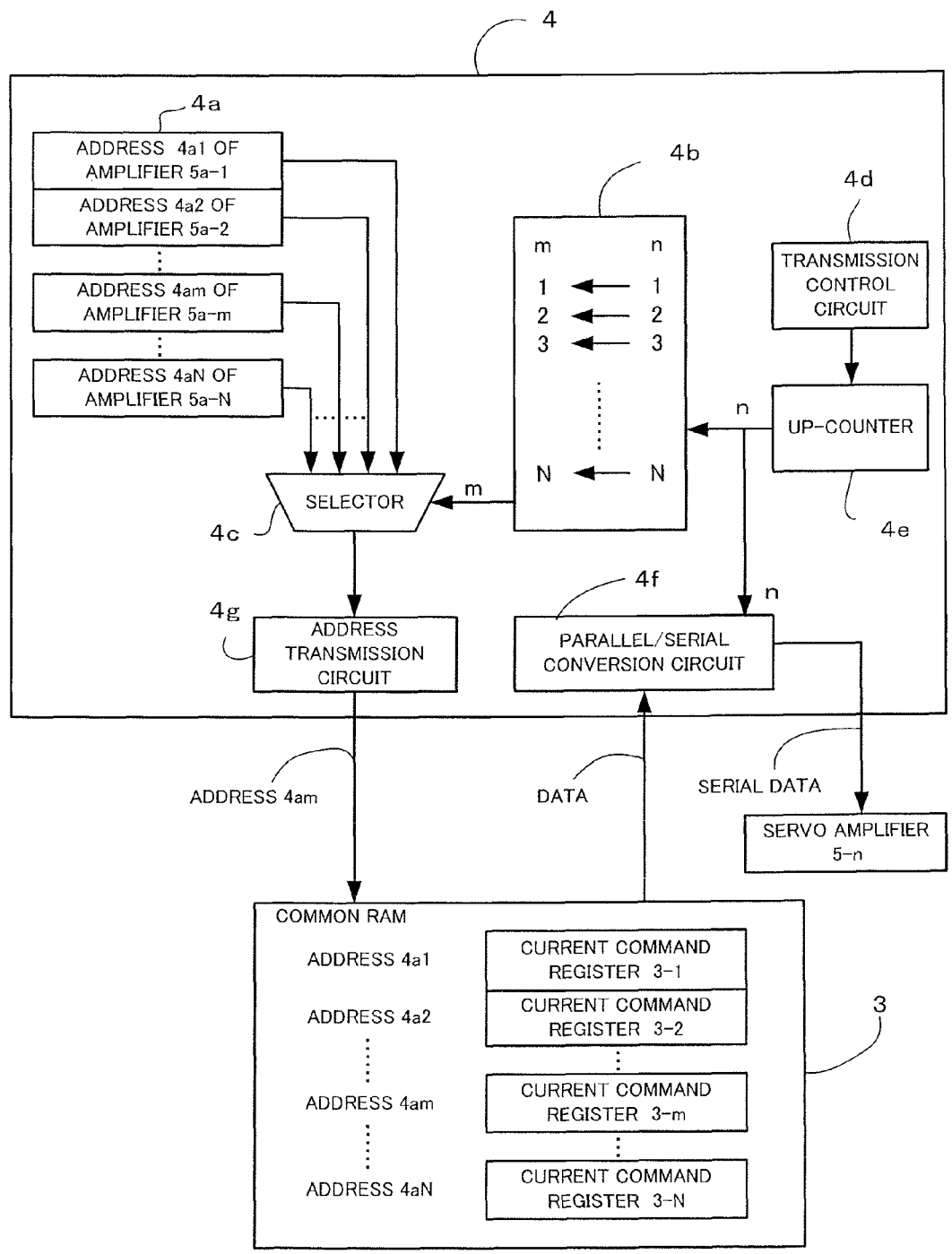
FIG. 5 is a schematic block diagram showing the serial bus control circuit of the numerical controller in FIG. 3, the serial bus control circuit being placed in a second control mode (normal control mode).

FIG. 5 shows a state of the conversion table 4b of the serial bus conversion circuit as shown in FIG. 4, in which the conversion table 4b has been rewritten to "m=1, 2, 3 ... ", instead of "m=1, 1, 3 ... ", with respect to "n=1, 2, 3 ... " (that is, n=m), being restored to normal control mode. In the normal control mode, the address 4an of the n-th (n=1, 2, 3 ... ) servo amplifier 5-n is passed to the first common RAM 3, the current command value in the current command register 3-n corresponding to the address 4an is read out and the current command value is passed to the n-th servo amplifier 5-n through the parallel/serial conversion circuit 4f.

FIG. 6 is a flowchart showing an example of the algorithm executed by the serial bus control circuit 4 of the servo control system of the present invention.

The transmission control circuit 4d resets the up-counter 4e (step S100). The up-counter 4e outputs the value "n" to the conversion table 4b and the parallel/serial conversion circuit 4f (step S101). First, "n=1" is output. The conversion table 4b outputs the "m" value corresponding to an input "n" value to the selector 4c according to the correspondence between "n" and "m" in the table (step S102). The selector 4c extracts the address 4am of the m-th servo amplifier 5-m from the address table 4a and sends it to the address transmission circuit 4g (step S103).

The address transmission circuit 4g sends the address 4am of the servo amplifier 5-m received from the selector 4c to the first common RAM 3 (step S104). The first common RAM 3 sends the register data in the current command register 3-m corresponding to the address 4am received from the address transmission circuit 4g to the parallel/serial conversion circuit 4f of the serial bus control circuit 4 (step S105).

The parallel/serial conversion circuit 4f converts the register data in the current command register 3-m received from the first common RAM 3 from parallel data to serial data (step S106) and gives the serial data to the (n-th) servo amplifier 5-n corresponding to "n" output from the up-counter 4e (step S107).

Whether the value "n" of the up-counter 4e reaches N (maximum value of "n") is determined. When it reaches N (YES in step S108), the sequence is finished. When it does not reach N (NO in step S108), the value "n" of the up-counter 4e is incremented by 1 (step S109), the sequence returns to step S101 and the processing is continued.

In the above descriptions, current command values are use as command values for servo amplifiers that drives the motor, but torque command values may also be used.

The invention claimed is:

1. A servo motor control system in which a controller and a plurality of servo amplifiers are connected through a serial bus, current command values generated by the controller are sent to the plurality of servo amplifiers through the serial bus to drive a servo motor based on the current command values, the controller comprising:
  a plurality of current command registers that store the current command values, which are a plurality of parallel signals, to be given to the servo motor; and a serial bus control circuit that reads the current command values from the plurality of current command registers, converts the read data to serial data, and sends the serial data to the plurality of servo amplifiers through the serial bus;

wherein the serial bus control circuit has a rewritable conversion table that specifies correspondence between the plurality of the servo amplifiers and the current command values stored in the plurality of the current command registers and sends the current command values stored in the current command registers to corresponding servo amplifiers through the serial bus according to the correspondence specified by the conversion table;

and wherein, by rewriting the conversion table, a current command value is read repeatedly from one of the plurality of current command registers and the read value is sent to two or more corresponding servo amplifiers to drive one or more servo motors using an identical current command value.

* * * * *